(12) United States Patent
Rinieri

(10) Patent No.: US 11,839,169 B2
(45) Date of Patent: Dec. 12, 2023

(54) INTER-ROW MACHINE

(71) Applicant: RINIERI S.R.L., Forli' (IT)

(72) Inventor: Nicola Rinieri, Forli' (IT)

(73) Assignee: RINIERI S.R.L., Forli' (IT)

( * ) Notice: Subject to any disclaimer, the term of this patent is extended or adjusted under 35 U.S.C. 154(b) by 468 days.

(21) Appl. No.: 17/103,104

(22) Filed: Nov. 24, 2020

(65) Prior Publication Data

US 2021/0153415 A1 May 27, 2021

(30) Foreign Application Priority Data

Nov. 25, 2019 (IT) .......................... 202019000004218

(51) Int. Cl.
*A01B 39/16* (2006.01)
*A01G 17/08* (2006.01)
*A01G 3/00* (2006.01)

(52) U.S. Cl.
CPC ................ *A01B 39/16* (2013.01); *A01G 3/00* (2013.01)

(58) Field of Classification Search
CPC ...... A01D 75/185; A01D 34/863; A01G 3/04; A01G 3/0417; A01G 3/0435; A01G 3/0408; A01G 17/085; A01G 3/00; A01B 39/16
See application file for complete search history.

(56) References Cited

U.S. PATENT DOCUMENTS

| | | | | |
|---|---|---|---|---|
| 4,444,001 A | * | 4/1984 | Thurnau | A01D 45/16 56/27.5 |
| 4,989,365 A | * | 2/1991 | Roger | A01G 17/085 47/1.01 R |
| 6,374,538 B1 | * | 4/2002 | Morris | A01G 17/026 47/1.01 R |
| 10,448,571 B1 | * | 10/2019 | McFarland | A01G 17/026 |
| 10,999,977 B2 | * | 5/2021 | Maddux | A01M 7/00 |
| 11,375,672 B2 | * | 7/2022 | Cortopassi | A01G 3/0535 |

(Continued)

FOREIGN PATENT DOCUMENTS

| | | |
|---|---|---|
| CN | 203912472 U | 11/2014 |
| DE | 10010548 C1 | 2/2001 |

(Continued)

OTHER PUBLICATIONS

DE 10010548 translation (Year: 2001).*

(Continued)

*Primary Examiner* — Monica L Perry
(74) *Attorney, Agent, or Firm* — CANTOR COLBURN LLP

(57) ABSTRACT

An inter-row machine, of the type used to work laterally to the travel path of the tractor by which it is towed or pushed, during the treatment of the land in espalier orchards or vineyards, having one or two working units, each preceded by a probe element which actuates, at each obstacle to be avoided, a known (hydraulic, pneumatic or electric) device for movement transversely to the travel path and to the row. The encounter of each probe with the obstacle to be avoided causes the rotation of the tool of the corresponding working unit—so that the translation of the latter, which is transverse to the travel path of the tractor, is directly proportional to the angular displacement performed by the tool and reported by an electromagnetic sensor to the electronic controller of the machine.

2 Claims, 3 Drawing Sheets

(56) References Cited

U.S. PATENT DOCUMENTS

2006/0162309 A1 * 7/2006 Schloesser ............. A01G 17/02
                                                               56/255
2006/0272201 A1 * 12/2006 Pellenc ................ A01B 69/001
                                                              47/1.01 R

FOREIGN PATENT DOCUMENTS

| DE | 10346818 A1 * | 4/2004 | ............. A01B 73/02 |
|----|---------------|--------|--------------------------|
| EP | 2062472 A1    | 5/2009 |                          |
| EP | 3412123 A1    | 12/2018|                          |

OTHER PUBLICATIONS

DE-202006019244-U1 (Year: 2008).*
SU 688156 A (Year: 1979).*
CN 111165170 A (Year: 2020).*
EP Search Report dated Apr. 13, 2021 re: Application No. EP 20 20 8972, pp. 1-7, citing: DE 100 10 548 C1, Ep 3 412 123 A1, CN 203 912 472 U, EP 2 062 472 A1.

* cited by examiner

INTER-ROW MACHINE

CROSS-REFERENCE TO RELATED APPLICATIONS

This application is related to and claims the benefit of Italian Application No. 202019000004218, filed on Nov. 25, 2019, the contents of which are incorporated herein by reference in their entirety.

TECHNICAL FIELD

Inter-row machines, also known as inter-vine or over-the-row machines, are agricultural machines equipped to work laterally with respect to the travel path of the tractor that tows or pushes them during land treatment in espalier orchards and vineyards.

BACKGROUND

These machines in fact have a working unit which can move with respect to the frame for coupling to the tractor, since between the two there is a (hydraulic, mechanical or electrical) device for the automatic retraction of said working unit toward the tractor transit region every time an adapted probe element, of a known type and in a forward position, encounters the stem of a plant or any other obstacle such as the post of a vineyard or of an orchard.

Likewise, the same device, once it has passed the obstacle to be avoided, automatically returns the working unit to protrude laterally to the machine between one plant of the row and the next.

If these machines are designed to work simultaneously on two rows, they are equipped with a matching number of working units, each provided with its own hydraulic jacks for transverse translations, which are automatic or not, necessarily autonomous.

However, during the use of these machines the tractor operator is forced to monitor personally and constantly the work performed on the row or rows on which he is working, and must personally correct, when necessary and in a timely manner, the travel direction of the tractor or the swing of the two working units so that they can work in the best possible way between the respective rows.

SUMMARY

The aim of the present disclosure is to avoid the above mentioned drawback by providing an inter-row machine that performs, in a timely manner and automatically, when necessary, the corrections needed so that the machine can always operate in the best possible way.

BRIEF DESCRIPTION OF THE DRAWINGS

This aim and other advantages that will become more apparent hereinafter are achieved by providing an inter-row machine as claimed in the independent claim.

Further characteristics and advantages of the present disclosure will become more apparent hereinafter by the description of a preferred but not exclusive embodiment of the present disclosure, illustrated, by way of non-limiting example, in the accompanying drawings, wherein.

DETAILED DESCRIPTION OF THE DRAWINGS

As a preliminary consideration, it is appropriate to specify that it differs from all known inter-row machines especially in that the retraction of the working units B and C from the rows D and E toward the transit region of the tractor M and of the machine A occurs only after the rotation of the respective blades 4 (FIG. 3) or of other tools and is directly proportional to the rotation angle traced by each one of said blades 4 during the encounter of the probe 1 with a plant or other obstacle present in the row.

Figure 1:
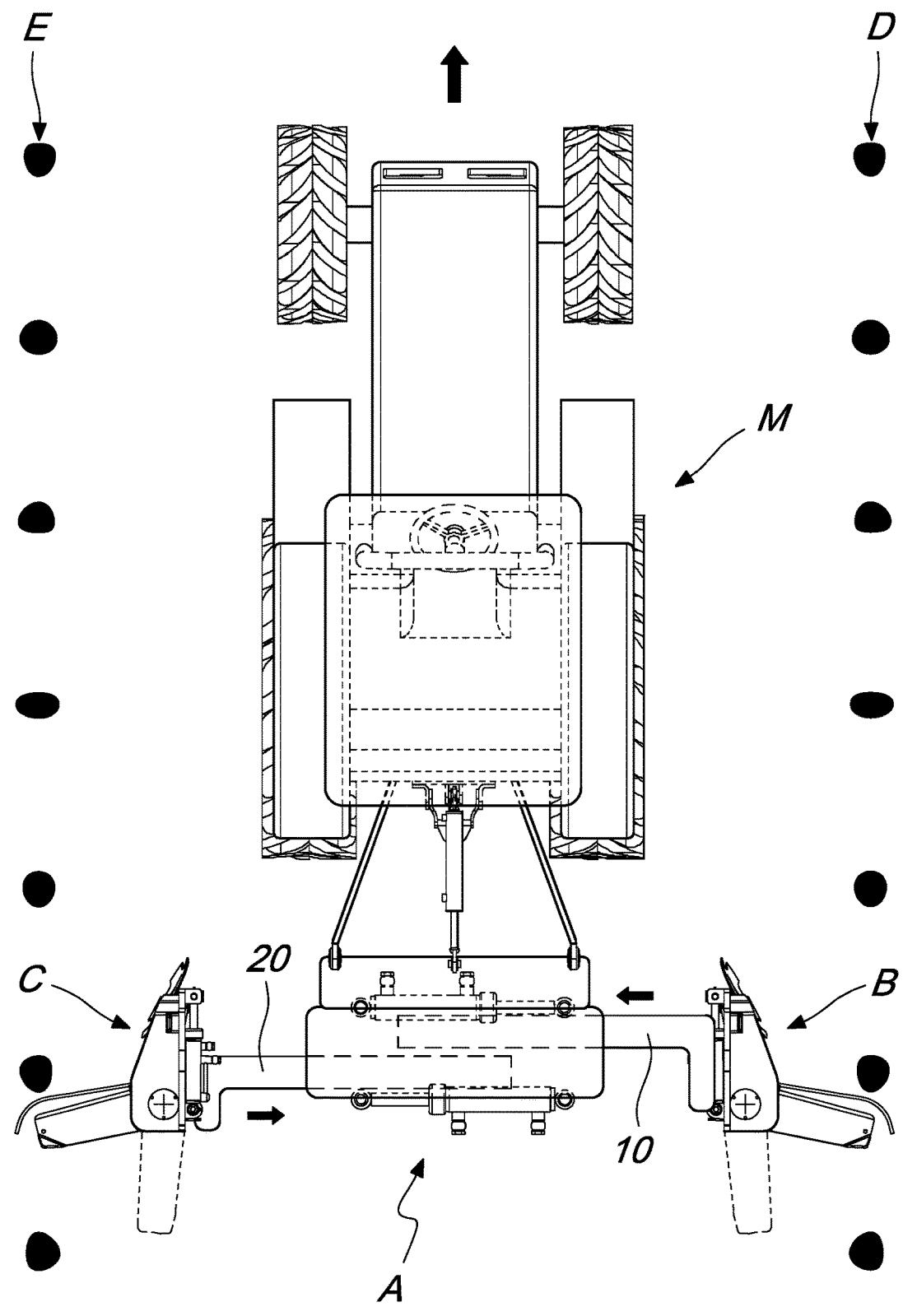
FIGS. 1 and 2 show two moments of operation of the inter-row machine A according to the disclosure, seen from above and while, towed by a tractor M, it is traveling forward while acting with its working units B and C between the plants of the rows D and E.

In particular, FIG. 1 shows the normal operating configuration of the two working units B and C that belong to the machine A and are shown here with the probe 1 and the blade 4 that protrude between the plants of the rows D and E on which to work, while a dashed line graphically indicates the maximum angular displacement provided for said blades 4.

Figure 3:
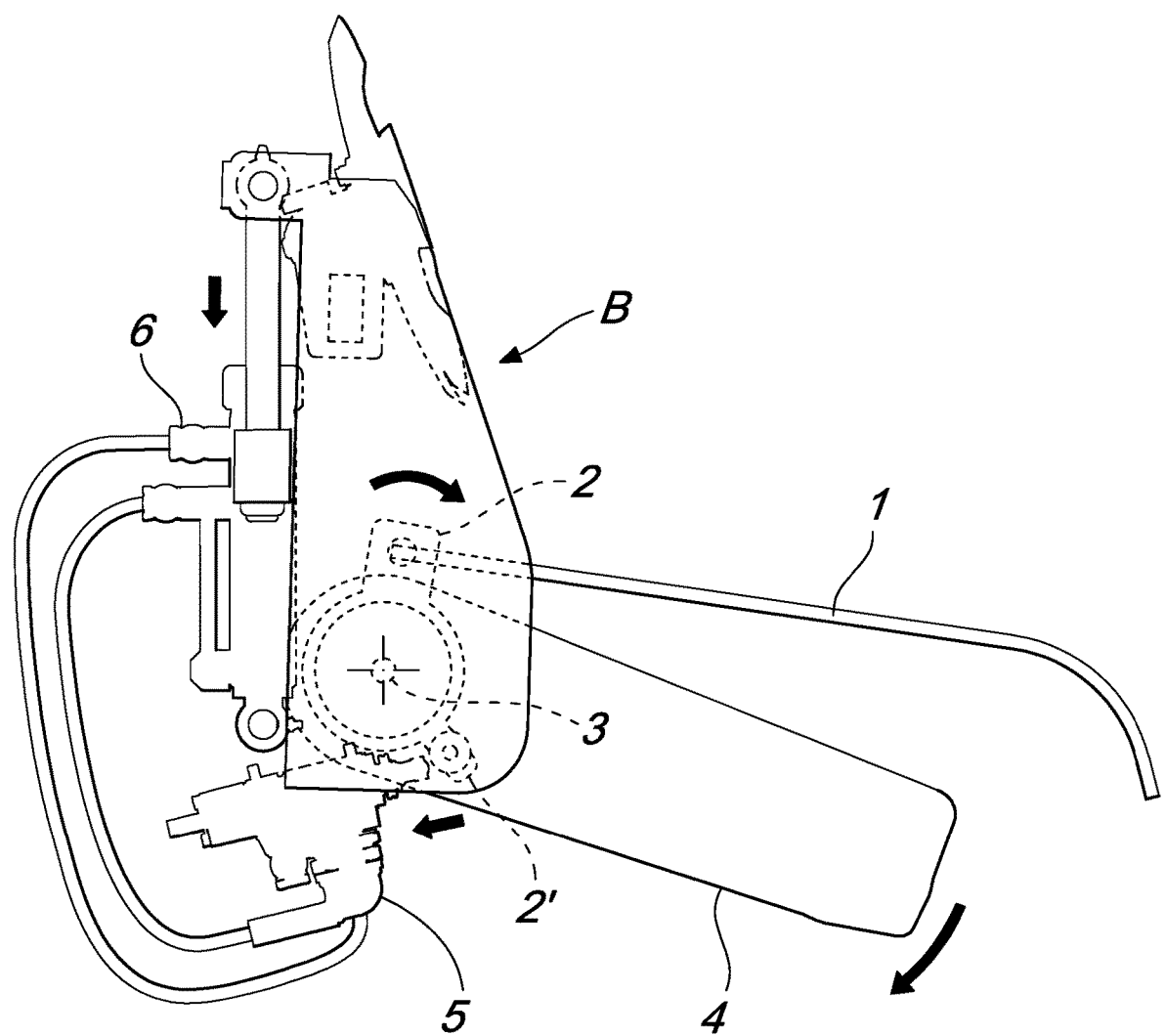
FIG. 3 is instead an enlarged-scale top view of one of the two working units of FIGS. 1 and 2.

Observing in detail the working unit of FIG. 3, it can be understood that the rotation imposed on the probe 1 by the encounter with an obstacle of the row can cause the support 2 to rotate about the rotation pivot 3 of the blade 4.

The lever 2', by protruding from the rotating support 2, acts on the hydraulic distribution unit 5, which sends oil to the jack 6 to force the blade 4 to rotate about the pivot 3 until it avoids the obstacle encountered by the probe 1.

In the meantime, the angular displacement performed by the tool 4 by rotating about its own axis is detected by an electromagnetic sensor of a known type and is transmitted to an electronic controller so that it acts accordingly on the hydraulic jacks provided for the linear movement of the transverse telescopic bars 10 and 20 that bear the working units B and C to be positioned at the correct distance from the respective rows D and E.

Figure 2:
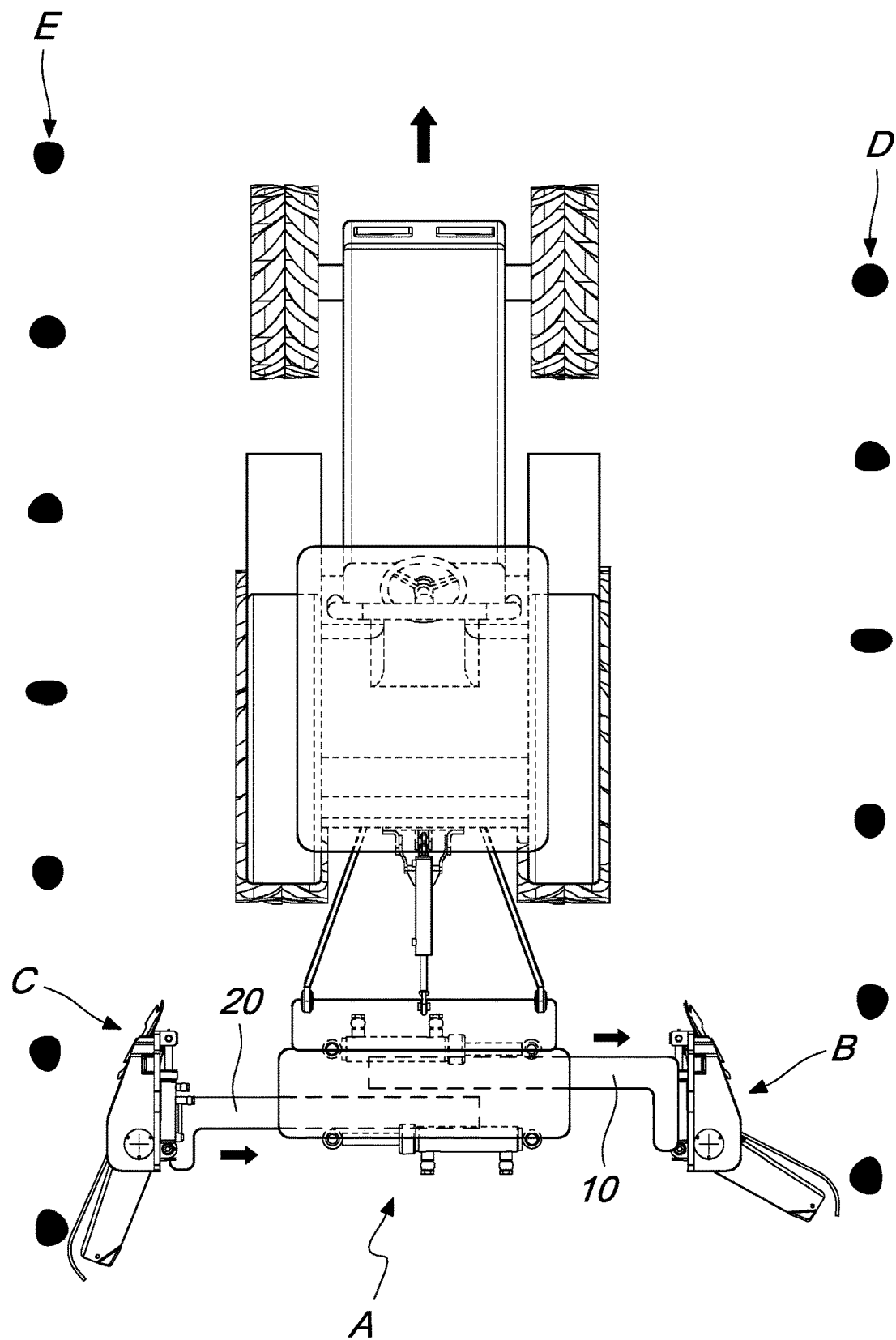

Furthermore, in situations such as the one shown in FIG. 2, i.e., when one of the two working units is too close to the plants of its own row while the other one has no contact with the plants between which it should work, the electronic controller, in addition to acting on the hydraulic jack of the telescopic bar 20 so that it displaces sufficiently the working unit C from the plants of the row E, also acts on the hydraulic jack of the telescopic bar 10 so that it correctly arranges the working unit B adjacent to the plants of the row D.

This occurs because the electronic controller of the inter-row machine according to the disclosure is programmed to act on the hydraulic jacks of the telescopic bars 10 and 20 in relation to the angular movements reported by the electromagnetic sensors of the two working units B and C, as well as when the reported angular movements are only those that arrive from a single electromagnetic sensor of the machine, since this is confirmation that one of the two working units needs to be moved closer to the row on which it must work.

It is obvious that the disclosure thus conceived is susceptible of numerous modifications and variations, all of which are within the scope of the appended claims.

What is claimed is:

1. An inter-row machine configured to work laterally to a travel path of a tractor by which it is towed or pushed, during the working of the land in vineyards or espalier orchards, the machine comprising: one or two working units, each preceded by a probe element which actuates, at an obstacle to be avoided, a hydraulic, pneumatic or electric device for movements transversely to a row and to a travel path of the tractor, wherein an encounter of the probe with an obstacle of the row causes an actuation of a hydraulic distribution unit and of a jack to force a blade or another tool of the working unit to rotate about its own axis to avoid the encountered obstacle, wherein angular displacement performed by each tool is detected by an electromagnetic sensor and transmitted to an electronic controller so that said electronic controller is configured to actuate a plurality of hydraulic jacks provided for a linear movement of transverse telescopic bars that support the working units to be arranged at a predetermined distance from the respective rows.

2. The inter-row machine according to claim 1, wherein the electronic controller is configured such that the hydraulic jacks of the telescopic bars in relation to angular displacements reported by the electromagnetic sensors of the two working units is programmed to actuate when the reported angular displacements are only those that arrive from a single electromagnetic sensor, to confirm that the working unit of the other electromagnetic sensor needs to be moved closer to the row on which it must work.

* * * * *